June 20, 1961
L. C. OERTLE, JR
2,989,127
SOIL TILLING APPARATUS
Filed April 10, 1958
5 Sheets-Sheet 4
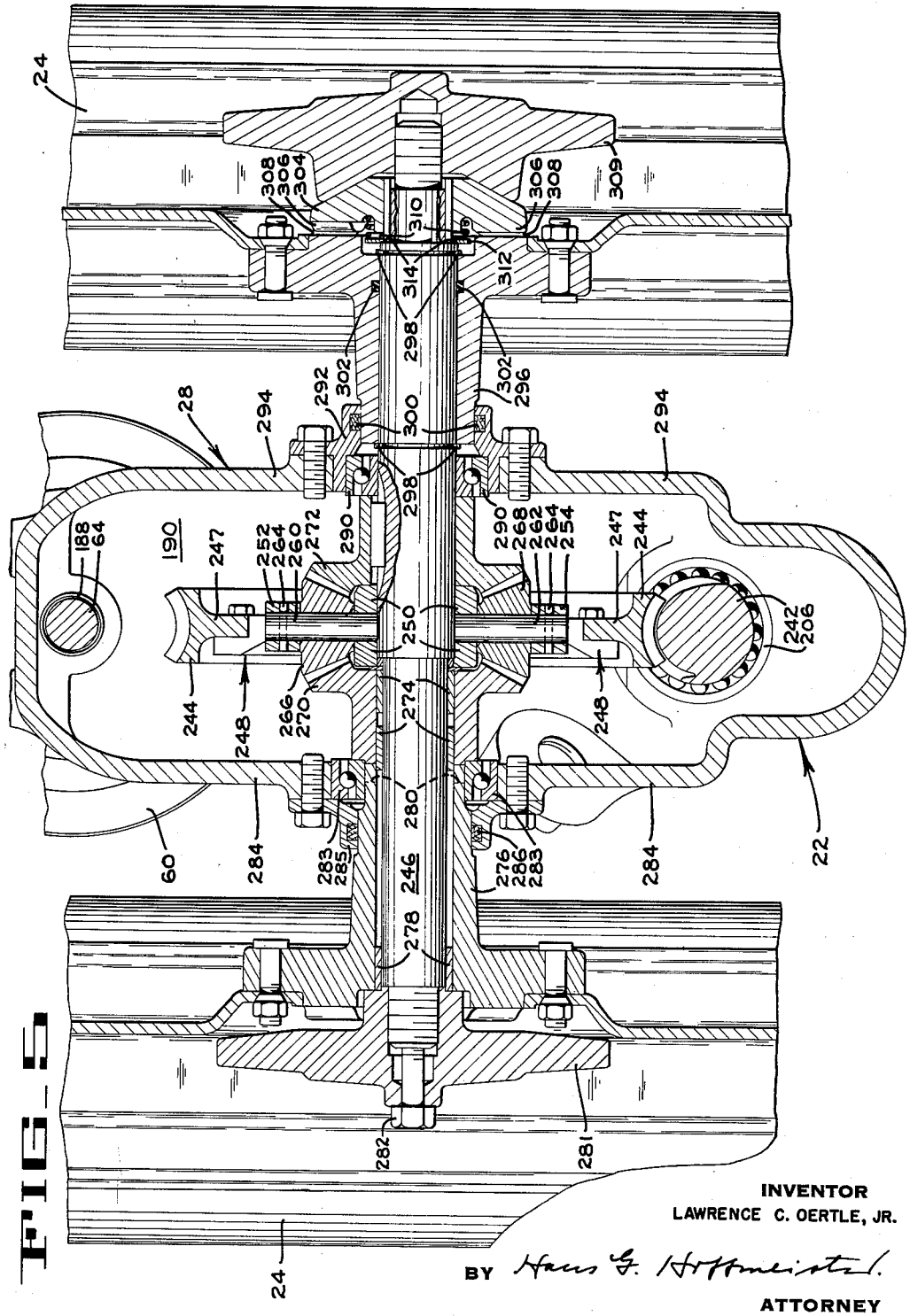
INVENTOR
LAWRENCE C. OERTLE, JR.
BY Hans G. Hoffmeister.
ATTORNEY

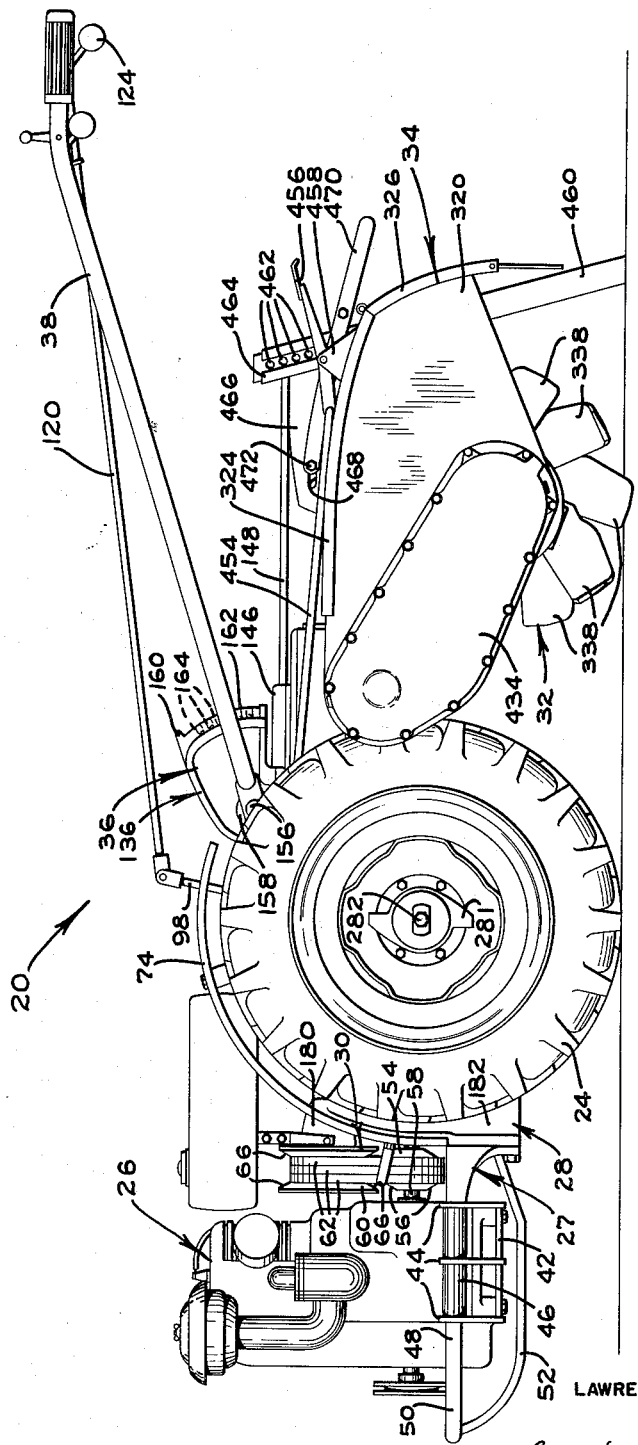

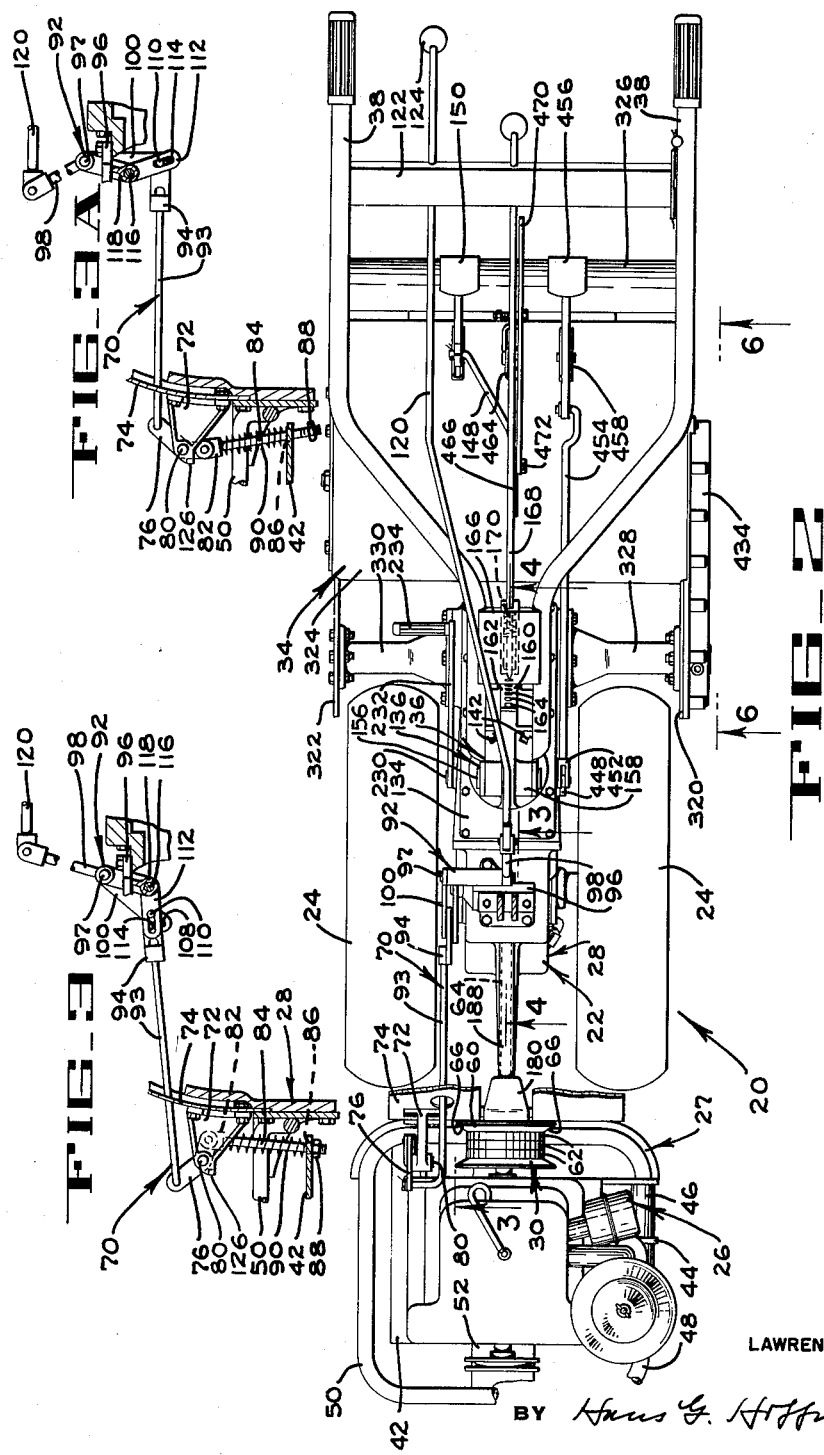

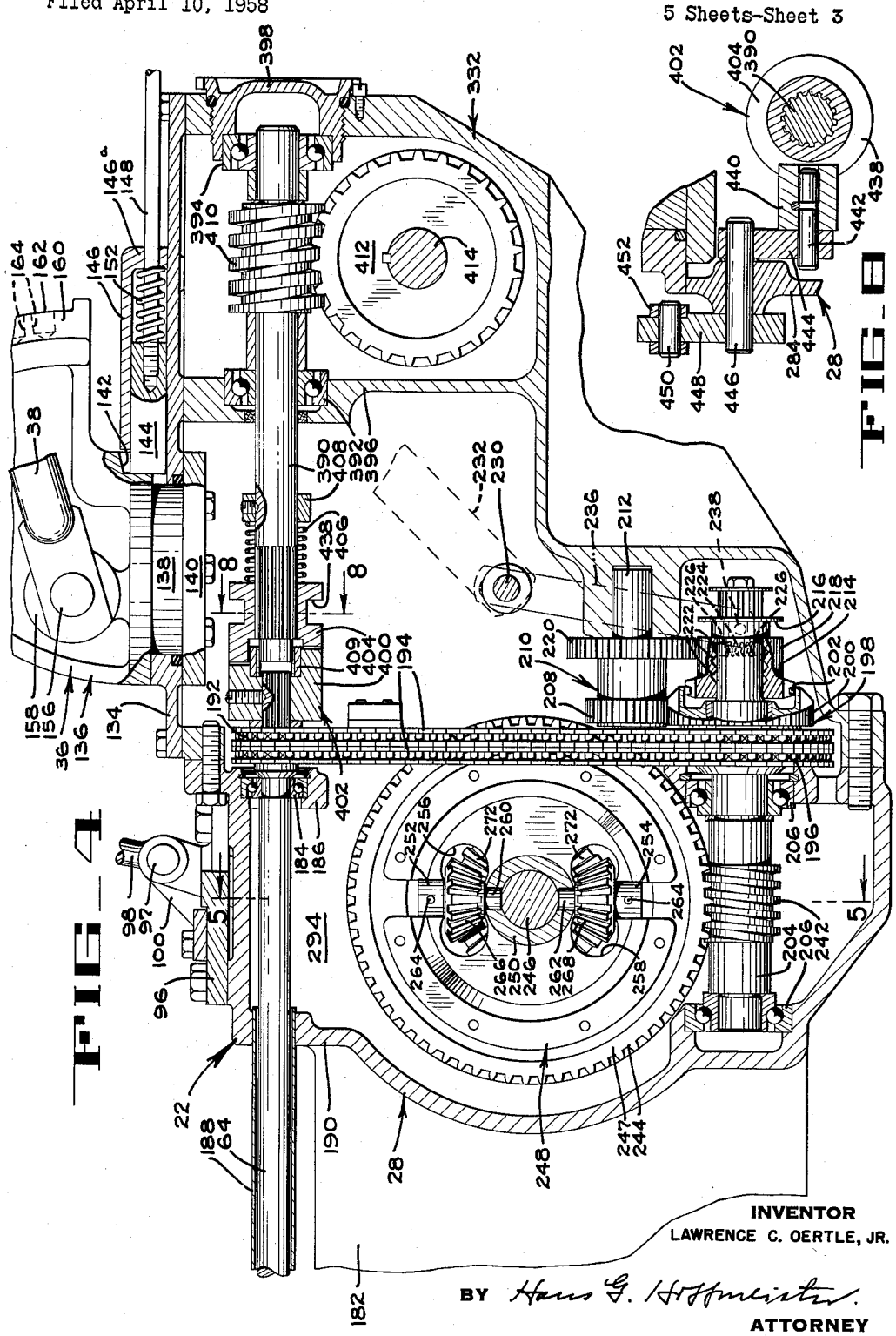

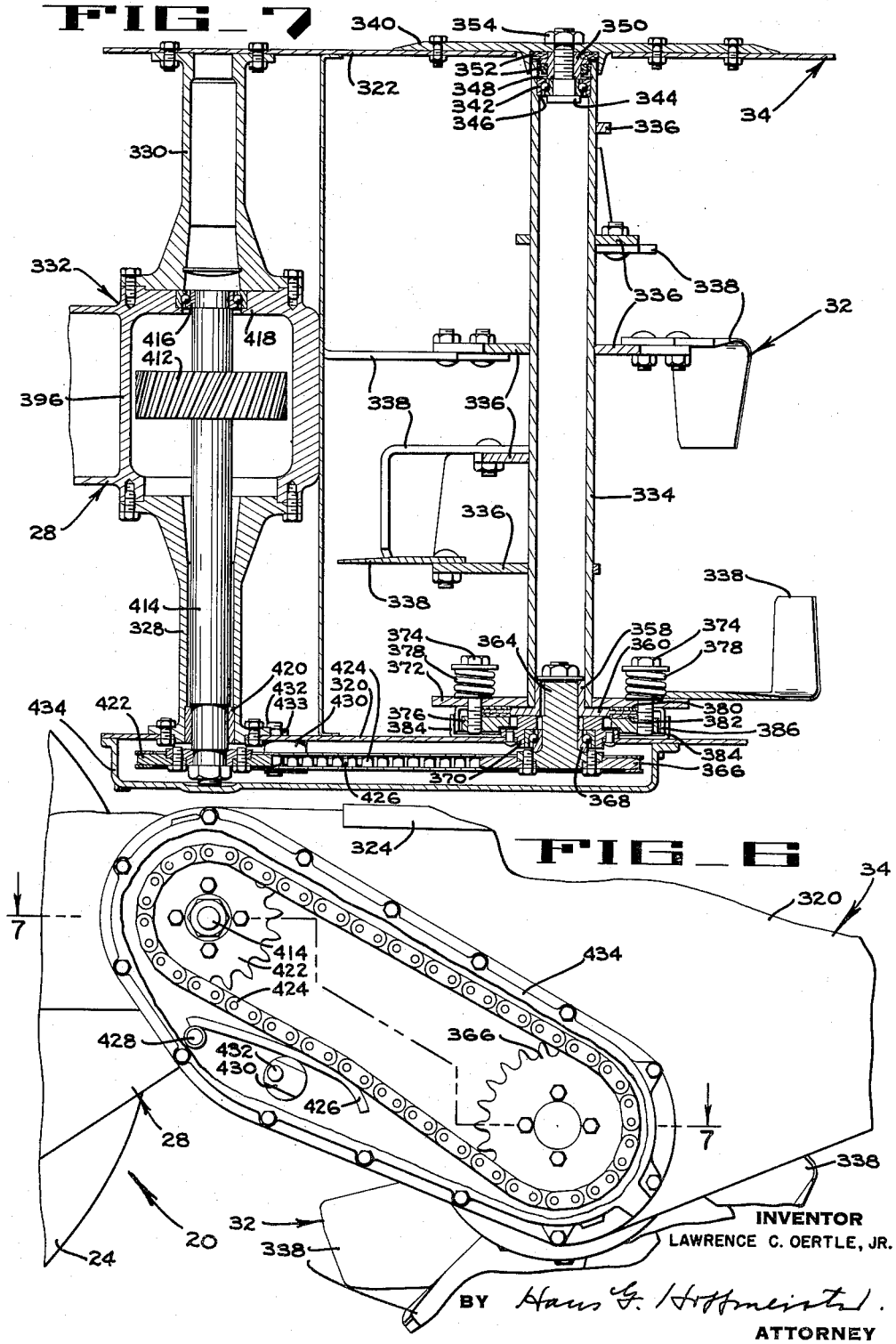

United States Patent Office 2,989,127
Patented June 20, 1961

2,989,127
SOIL TILLING APPARATUS
Lawrence C. Oertle, Jr., Random Lake, Wis., assignor to Food Machinery and Chemical Corporation, San Jose, Calif., a corporation of Delaware
Filed Apr. 10, 1958, Ser. No. 727,725
4 Claims. (Cl. 172—42)

The present invention appertains to soil tilling apparatus of the type commonly referred to as garden tractors, and more particularly relates to power transmitting means for garden tractors or the like.

One object of the present invention is to provide improved power transmitting means for garden tractors or the like.

Another object is to provide improved transmission control means for garden tractors.

Another object is to provide improved drive means for a rotary tiller unit of a garden tractor.

Another object is to provide improved power transmitting means for a garden tractor arranged to be selectively adjusted to provide a number of different speed combinations between the engine, the drive wheels, and the power driven tiller unit.

These and other objects and advantages of the present invention will become apparent from the following description and the drawings in which:

FIG. 1 is a side elevation of one embodiment of the garden tractor of the present invention.

FIG. 2 is a top plan view of the garden tractor shown in FIG. 1, certain parts being broken away.

FIG. 3 is a fragmentary vertical section taken along lines 3—3 of FIG. 2, showing certain clutch actuating linkages arranged in a neutral position.

FIG. 3A is a fragmentary vertical section similar to FIG. 3 in a position wherein the engine clutch is locked in forward driving position.

FIG. 4 is an enlarged fragmentary section taken along lines 4—4 of FIG. 2, certain parts being shown in phantom and other parts being cut away.

FIG. 5 is a fragmentary section taken along lines 5—5 of FIG. 4.

FIG. 6 is a side elevation of a portion of the apparatus looking in the direction of arrows 6—6 in FIG. 2.

FIG. 7 is a section taken along lines 7—7 of FIG. 6.

FIG. 8 is an enlarged section taken along lines 8—8 of FIG. 4.

The garden tractor of the present invention illustrated in FIGURES 1 and 2 is indicated generally by reference numeral 20 and comprises a transmission 22 (FIG. 2) supported by and positioned between drive wheels 24. An engine 26 is mounted forwardly of the wheels 24 on a frame 27 which is bolted to a housing 28 of the transmission 22. The engine 26 is connected to the transmission through a V-belt clutch and drive assembly 30 (FIG. 1). A rotary tilling unit 32 rotatable in a tiller housing 34 is connected in driving engagement with the transmission 22. The garden tractor 20 is guided by a handle bar assembly 36 having handle bars 38 which can be pivotally raised or lowered, pivoted horizontally, and locked in any of a plurality of selected positions.

The engine 26 is bolted on a base plate 42 having upwardly extending arms 44 welded to the plate 42 and to a sleeve 46. The sleeve 46 is rotatable on a forwardly extending leg 48 of a rectangular bumper 50 which surrounds the base of the engine and constitutes a part of the frame 27. A centrally positioned skid member 52 is welded between the forward and rear portion of the bumper 50 to add rigidity to the frame and to prevent the engine from contacting the ground at any time.

A specially formed drive pulley 54 (FIG. 1) having beveled outer edges 56 is keyed to the engine output shaft 58 and is connected to a driven pulley 60 by means of V-belts 62. The driven pulley 60 is keyed to the drive shaft 64 of the transmission 22 and has outwardly flared flanges 66 formed thereon.

In order to drive the tractor forward, the engine 26 is pivoted about the axis of the sleeve 46 lowering the side of the engine 26 spaced from the sleeve 46 so as to tighten the V-belts 62 on the pulleys 54 and 60. To reverse the direction of travel of the tractor 20, the engine is pivoted upwardly to engage the beveled edges 56 of the pulley 54 with the flanges 66 of the driven pulley 60. When the engine 26 is pivoted intermediate the two above mentioned positions, the belts 62 are loose and the pulleys 54 and 60 do not contact thereby placing the clutch and drive assembly in a neutral position.

A linkage 70 (FIGS. 2 and 3) is employed for pivotally raising and lowering the engine 26 about the axis of the sleeve 46 into each of the above mentioned positions, i.e., reverse, neutral and forward, and constitutes a part of the clutch and drive assembly 30. The linkage 70 comprises a triangular bracket 72 (FIG. 3) bolted to a fender 74 rigidly secured to the transmission housing 28, as by bolting. A generally L-shaped lever 76 is mounted for rotation on the bracket 72 by means of a pin 80 projecting therefrom. A yoke 82 is pivotally connected to one end of the lever 76 and has a long, downwardly projecting bolt 84 secured thereto. The bolt 84 is loosely received in a hole 86 in the engine base plate 42 and has a nut 88 screwed on the end of the bolt 84 thereby operatively connecting the lever 76 to the engine base plate 42. A helical compression spring 90 is positioned around the bolt between the yoke 82 and the base plate 42. The function of the spring 90 is to provide the necessary tension on the belts 62 when the clutch and drive assembly 30 is arranged to drive the tractor 20 in a forward direction.

The other end of the lever 76 is pivotally connected to an over-center locking linkage 92 by an L-shaped rod 93 having a length adjusting connector 94 on one end. The locking linkage 92 comprises a bracket 96 (FIG. 2) bolted to the transmission housing 28 and rotatably supporting a shaft 97 (FIG. 3) to which is secured an upwardly extending lever 98 and a downwardly extending lever 100. A slot 108 is formed in the lower lever 100 to slidably receive a transverse pin 110 supported by the length adjusting connector 94 on the rod 93. A locking arm 112, having a slot 114 within which the pin 110 is slidable, is welded to a pin 116 which is mounted for rotation in a lower portion 118 of the bracket 96. The upper end of the lever 98 is pivotally connected to a control rod 120 which is slidably connected to a transverse member 122 of the handle bar assembly 36. A ball 124 is fitted on the end of the control rod 120 in a position easily reached by an operator so that the rod may be pushed or pulled to cause the above described linkage 70 to pivotally lower or raise the engine 26.

When the linkage 70 is in neutral position as shown in FIG. 3, the weight of the engine 26 on the bolt 84 tends to pivot the lever 76 clockwise thereby applying a force against the rod 93 towards the right (FIG. 3). This force is transmitted to the locking linkage 92 by the pin 110. As previously stated, the lever 100 is pivotally mounted on the shaft 97 which shaft remains in a fixed position, and the locking arm 112 is pivotally mounted on the pin 116 which pin also remains in a fixed position. As clearly shown in FIG. 3, the pin 110 is forced to the rearward end of the slots 108 and 114 and the compressive force acting along the rod 93 is directed along an imaginary line extending between the shaft 97 and the pin 116. Thus the weight of the engine 26 will not move the rod 93 to the right in FIG. 3 since the lever 100 and locking arm 112 cooperate to lock the rod 93 from movement in this direction.

When it is desired to drive the tractor 20 forward, the rod 120 is pushed forward thereby pivoting the levers 98 and 100 in a counterclockwise direction (FIG. 3) with the result that the lever 76 is pivoted to the position shown in FIG. 3A. It is noted that in this position the spring 90 is compressed thereby urging the frame downwardly and tensioning the belts 62 on the pulleys 54 and 60. It is also noted that the spring 90 exerts a force against the lever 76 which tends to pivot the lever in a clockwise direction (FIG. 3A). However, further clockwise pivotal movement beyond the position shown in FIG. 3A is prevented by a boss 126 on the triangular bracket 72 which the lever 76 contacts. Thus, the spring 90 locks the clutch and drive assembly 30 in forward driving position until the rod 120 is pulled rearwardly.

In order to reverse the direction of travel of the tractor 20 the rod 120 is pulled to its rearward limit by the operator and is held in this position throughout the entire interval of driving the tractor in reverse. Rearward movement of the rod 120 causes the levers 98 and 100 to pivot in a clockwise direction (FIG. 3) and the lever 76 to pivot in a counterclockwise direction, thus raising the engine frame and engaging the beveled edges 56 (FIG. 1) of the drive pulley 54 with the tapered flanges 66 of the driven pulley 60.

The handle bar assembly 36 is mounted for horizontal rotation on a cover plate 134 (FIGS. 2 and 4) of the transmission housing 28 by means of a turret 136. The turret 136 has a reduced diameter cylindrical neck 138 (FIG. 4) received for rotation in an opening in the cover plate 134 and prevented from axial displacement therefrom by a circular plate 140 bolted to the lower surface of the neck 138. Several radially spaced notches 142 (FIGS. 2 and 4) in the turret 136 are arranged to be selectively engaged by a latch 144 which is mounted for reciprocal movement in a housing 146 formed on the cover plate 134. A control rod 148 is threaded into the latch 144 and extends rearwardly through an opening formed in the end wall 146a of the housing 146 and is pivotally connected to a pedal 150 (FIG. 2) pivotally mounted on the tiller housing 34. A compression spring 152 (FIG. 4) is positioned around the rod 148 between the latch 144 and the end wall 146a of the housing 146. The spring 152 normally urges the latch 144 into a selected one of the several notches 142 in the turret 136 thereby locking the turret from horizontal rotary movement relative to the transmission 22. Should it be desired to swing the handle bars 38 horizontally relative to the transmission 22, the pedal 150 is depressed thus withdrawing the latch 144 from within its associated notch 142 permitting the turret 136 to be horizontally rotated to a new position. When the desired position is reached, the pedal 150 is released and the spring 152 forces the latch 144 into the notch 142 aligned therewith.

The handle bars 38 are connected to the turret 136 for vertical pivotal movement by a pin 156 which is received through both handle bars 38 and an apertured boss 158 formed integrally with the turret 136. A vertically extending locking web 160 (FIG. 1) is also integrally formed with the turret 136 and is centrally disposed between the two handle bars 38. The rearward, vertically extending edge 162 of the web 160 is arcuate and is provided with a plurality of notches 164 as indicated by the dotted lines in FIGURES 1, 2 and 4. A transverse plate 166 which is connected between the handle bars 38 closely adjacent the arcuate edge 162 of the web 160 slidably supports the forward end of a control rod 168, while the rearward end of the rod 168 is centrally supported by the aforementioned transverse member 122 of the handle bar assembly 36. A spring 170 (FIG. 2) is connected between the transverse plate 166 and the forward end of the control rod 168 to urge the forward end of the control rod into a selected one of the notches 164. The handle bars 38 may be pivotally raised or lowered by pulling rearwardly on the control rod 168 thereby releasing the end of the rod 168 from engagement with the notches 164. When the desired handle bar height is reached the rod 168 is released and the forward end thereof will be spring urged into one of the notches 164 to lock the handle bars 38 in the desired vertical position.

Thus, it is apparent that the handle bars 38 by which the tractor 20 is guided can be adjusted both vertically and horizontally for the convenience of the operator.

Since the garden tractors 20 of the type described herein must operate in soils having different textures and workability, it is desired that the tractor 20 have more than one forward speed to better adapt the tractor 20 to handle a variety of different soil types. The transmission 22 is designed to provide two forward speed ranges for the tractor and one speed range for the rotary tiller.

The transmission drive shaft 64 (FIG. 2), which has the driven pulley 60 keyed on the forward end, is supported adjacent the pulley 60 by a boss 180 which is integral with a vertical web 182 (FIGS. 1 and 4) of the transmission housing 28. The forward end of the shaft 64 is rotatable in suitable bearings (not shown) in the boss 180. The rear portion of the shaft is journaled in a bearing 184 supported by a boss 186 integral with the transmission housing 28. The portion of the shaft which extends between the boss 180 and the enclosed portion of the housing 28 is protected by a tube 188 surrounding the shaft 64 and secured to the boss 180 and to a vertical wall 190 of the housing 28.

The rearward end of the transmission drive shaft 64 is splined and has a double sprocket 192 keyed thereon. Chains 194 are trained over the sprocket 192 and over a sprocket 196 which is formed integrally with a sprocket and gear assembly 198 which includes an external gear 200 and an internal gear 202. The sprocket and gear assembly 198 is mounted for rotation on a shaft 204 which is in turn mounted for rotation within the transmission housing by ball bearings 206. The external gear 200 meshes with a small diameter gear 208 of a gear cluster 210 which is mounted for rotation on a stub shaft 212 rigidly secured in the housing 28. A sliding gear 214 having an annular groove 216 formed in its hub 218 is internally splined and is received for axial sliding movement on a splined end portion of the shaft 204. The sliding gear 214 is arranged to be slid and locked into any one of three selective positions. In the first position, shown in FIGURE 4, the sliding gear 214 meshes with the internal gear 202 causing the shaft 204 to rotate at the same speed as the sprocket and gear assembly 198. In the second position the sliding gear 214 meshes with a large diameter gear 220 of the gear cluster 210, and hence, the shaft 204 is driven at a slower speed than when the gear is in the first mentioned position. The third position of the sliding gear 214 is intermediate the first and second positions wherein the gear 214 does not mesh with any other gear. In this position the transmission is in "neutral" in that power from the drive shaft 64 is not transmitted to the wheels 24 of the tractor 20.

For the purpose of locking the sliding gear 214 in each of its three desired positions, three V-shaped annular grooves 222 are formed in the bore of the hub 218. The shaft 204 is diametrically drilled to receive a compression spring 224 with a ball 226 disposed at each end thereof. The spring 224 urges the balls diametrically outward and into the particular V-shaped groove 222 aligned therewith to hold the sliding gear 214 in adjusted position. The three grooves 222 are so spaced that the balls 226, when seated in the grooves 222, will hold the sliding gear 214 in the three above mentioned positions.

The linkage for actuating the sliding gear 214 is shown partially in phantom in FIGURE 4. A shaft 230 extends transversely across and is rotatable in the transmission housing 28 and projects out the right side thereof as shown in FIG. 2. A lever 232, having a hand grip 234, is rigidly secured to the shaft 230 whereby movement of the lever 232 will rotate the shaft 230. Also rigid with the shaft 230 is a shifting arm 236 (FIG. 4) having a pin 238 in position to engage the groove 216. Thus, movement of the lever 232 will cause movement of the sliding gear 214.

A worm 242 on the shaft 204 meshes with a worm gear 244, which is supported by the axle 246 of the tractor 20. The worm gear 244 is formed as a ring 247 of T-shaped cross section as shown in FIG. 5. The worm gear 244 is bolted to a one-piece carrier 248 (FIG. 4) which includes a hub 250 rotatable on the axle 246, two diametrically opposed hubs 252 and 254 and two slots 256 and 258 adjacent the hubs 252 and 254, respectively. The hubs 252 and 254 and the hub 250 are bored to receive short shafts 260 and 262 which are pinned to the hubs 252 and 254, respectively, by pins 264. Bevel gears 266 and 268 are rotatable on the shafts 260 and 262, respectively, and positioned in the slots 256 and 258, respectively. Both of the bevel gears 266 and 268 mesh with bevel gears 270 and 272 (FIG. 5). The bevel gear 270 is rotatably mounted on the axle 246 by means of bushings 274 and is coupled to a wheel hub 276 which is also rotatably mounted on the axle 246 by means of a bushing 278. The coupling of the gear 270 to the hub 276 is by the well known method of interengaging slots and tongues as indicated at 280 (FIG. 5) by the dotted lines. One wheel 24 is bolted to the hub 276 and a wing nut 281 is screwed on the threaded end of the axle 246 to prevent axial separation of the hub 276 from the bevel gear 270. A cap screw 282 is screwed into the axle 246 to positively lock the wing nut 281 on the axle 246. A bearing 283 (FIG. 5) is mounted in the bored side wall 284 of the transmission housing 28 and engages the adjacent end portion of the bevel gears 270 and hub 276 to rotatably mount the same relative to the axle 246. A collar 285 having an oil and dust seal 286 therein surrounds the hub 276 and is bolted to the side wall 284.

The bevel gear 272 is keyed to the axle 246 which is rotatable in a bearing 290 supported in a collar 292 bolted to the other side wall 294 of the transmission housing 28. A hub 296 to which the other wheel 24 is bolted is rotatable on the axle 246 and is held from axial movement thereon by snap rings 298 secured in grooves in the axle 246. An oil and dust seal 300 in the collar 292 surrounds the hub 296 while a similar seal 302 is provided between the hub 296 and the axle 246. A clutch member 304, having rounded teeth 306 thereon which mate with teeth 308 on the hub 296, is keyed to the axle 246. The teeth 306 of the clutch member 304 are normally held in fixed engagement with the teeth 308 by a wing nut 309 which is screwed on the axle 246 and bears against the clutch member 304 to prevent axial movement thereof.

Since the worm 242 and the worm gear 244 are included in the transmission gearing, it will be recognized that the axle 246 will rotate only when driven by the worm 242. With the wheels 24 coupled to the transmission 22 as above described, the tractor 20 cannot be freely pushed along the ground since the engagement between the worm 242 and worm gear 244 locks the axle 246 from rotation. For permitting the tractor 20 to be freely pushed from place to place a release arrangement is provided which includes a compression spring 310 positioned around the axle 246 and bearing against a washer 312 held against a shoulder 314 on the axle 246 and against the clutch member 304 to urge the same away from the hub 296. Thus, when the nut 309 is unscrewed several turns, the spring 310 forces the clutch member 304 away from the hub 296 so that the teeth 306 and 308 are no longer engaged. The hub 296 then rotates freely on the axle 246 making it possible to push the tractor 20 from place to place.

The rotary tiller unit 32 (FIG. 1) is mounted for rotation within the tiller housing 34. The housing 34 comprises spaced side plates 320 and 322 (FIG. 7) having a top cover 324 welded thereon, and a rear cover plate 326 hinged to the cover 324 and arranged to be pivoted upward for ease in inspecting the rotary tiller unit 32. The side plates 320 and 322 (FIG. 7) are bolted to housings 328 and 330, respectively, which are bolted to opposite sides of the power take-off portion 332 of the transmission housing 28.

The rotary tiller unit 32 comprises a tubular axle 334 (FIG. 7) having a plurality of spaced radially projecting arms 336 with a ground engaging tine 338 bolted on each arm 336. One end of the tubular axle 334 is rotatably mounted to a flanged stiffening plate 340 which is bolted to the side plate 322. A bearing 342 on a shouldered bolt 344 is locked from axial movement in the tubular axle 334 by means of a shoulder 346 in the axle 334, which contacts one side of the bearing 342, and a snap ring 348 secured in the axle 334 and arranged to contact the other side of the bearing 342. A spacer ring 350 having dust seals 352 therein is screwed on the bolt 344 and locked to the stiffening plate 340 by a nut 354 screwed on the bolt 344.

The other end of the axle 334 fits around the hub 358 of a disc 360 which is both bolted and keyed to the hub 364 of a sprocket 366. The sprocket 366 is rotatably mounted by a bearing 368 held in a collar 370 secured to the side plate 320. A flange 372 is welded on the axle 334 and is apertured adjacent its periphery to receive bolts 374 therethrough. The bolts 374 are screwed in an annular clutch disc 376 and are urged toward the flange 372 by means of compression springs 378 positioned between the head of each bolt 374 and the flange 372. The disc 360 is recessed adjacent its periphery to receive two annular discs 380 and 382 of material having a high coefficient of friction. The springs 378 cause the clutch disc 376 and the flange 372 to frictionally engage the friction discs 380 and 382, respectively, thereby providing a driving connection between the sprocket 366 and the axle 334. An annular dust cover 384 secured to the side plate 320 cooperates with a similar dust cover 386 secured to the flange 372 to substantially prevent dust and dirt from entering the area containing the discs 380 and 382.

In order to drive the rotary tiller unit 32, a shaft 390 (FIG. 4) is journaled in bearings 392 and 394 mounted in a transverse wall 396 and an end cap 398, respectively, of the transmission housing 28. The shaft 390 is adjacent to and concentric with the transmission drive shaft 64 so that the driving element 400 of a jaw clutch 402 will engage the driven element 404 of the clutch 402. The driving element 400 is locked on the end of the shaft 64 while the driven element 404 is internally splined and is received on the splined end of the shaft 390 for axial sliding movement relative to the shaft 390 and into and out of driving engagement with the driving element 400. A compression spring 406 is positioned around the shaft 390 between the driven element 404 and a collar 408 locked on the shaft 390 to normally hold the driven element 404 in driving engagement with the driving element 400 of the clutch 402. A bushing 409 is secured to the driving element 400 and is arranged to receive and support the end of the shaft 390.

A worm 410 is keyed to the shaft 390 and meshes with a worm gear 412 which is keyed to a power take-off shaft 414. The shaft 414 (FIG. 7) extends through the housing 328 and is mounted for rotation therein by means of a bearing 416 in a side wall 418 of the power take-off portion 332 of the transmission housing 28 and by a sleeve bearing 420 in the outer end portion of the housing 328. A sprocket 422 is keyed and bolted to the shaft 414 and is connected to the sprocket 366 by a drive chain 424. A chain adjusting shoe 426 (FIG. 6) is pivotally mounted on the side plate 320 by a bolt 428 in position to engage the chain 424. An eccentric 430 is mounted by a bolt 432 in position to bear against the shoe 426 to force the shoe 426 against the chain 424 to tighten the same. After the chain has been tightened the desired amount, a nut 433 (FIG. 7) is screwed on the bolt 432 to firmly lock the eccentric 430 on the side plate 320. A guard 434 is fitted around the chain 424 and bolted to the side plate 320.

For the purpose of selectively engaging the driven element 404 (FIG. 4) of the jaw clutch 402 with the drive element 400, the element 404 is provided with an annular groove 438. A block 440 (FIG. 8) rides in the groove 438 and is rotatably mounted on a pin 442 rigid on an arm 444. The arm 444 is rigidly secured to a shaft 446 which is rotatable in the side wall 284 of the transmission housing 28. A lever 448 is rigidly secured on the shaft 446 and is coupled by a pin 450 to a yoke 452 on one end of a control rod 454 (FIGS. 1 and 2). The other end of the control rod 454 is connected to a pedal 456 pivotally mounted on the cover 324 of the tiller housing 34 by means of a bracket 458.

In order to disengage the driven element 404 (FIG. 4) from the drive element 400 of the clutch 402, the pedal 456 is moved to the position shown in FIG. 1. In this over-center position of the rod 454, the spring 406 (FIG. 4) acts through the linkage shown in FIG. 8 exerting a rearward force on the rod 454 thereby locking the pedal 456 from further pivotal movement by forcing the forward end thereof firmly against the cover 324 of the tiller housing 34. When the pedal 456 is pivoted in a clockwise direction (FIG. 1), the spring 406 acts through the linkage to move and lock the clutch members 400 and 404 (FIG. 4) into engagement. The spring 406 also exerts a rearward force on the control rod 454 through the linkage to hold the rear portion of the pedal 456 (FIG. 1) against the cover 324. It is to be particularly noted that when the rear cover 326 is raised, the cover 326 will engage the pedal 456 to move the same to the clutch disengaging position shown in FIG. 1. Thus, when the cover 326 is raised, the rotary tiller unit 32 is stationary, minimizing the possibility of an operator being injured by the rotary tiller unit 32.

For determining the depth to which the rotary tiller unit 32 will enter the soil, a substantially vertical depth control rod 460, having a plurality of spaced holes 462 in the upper end thereof, is slidably mounted in a bracket 464 secured on the top cover 324 of the tiller housing 34. A vertical web 466 having a slot 468 therein is rigidly secured to the bracket 464 and to the cover 324 and serves to adjustably support a depth gauge lever 470 by means of a bolt 472 extending through the slot 468 and the lever 470. A pin (not shown) on the depth gauge lever 470 is arranged to be selectively received and locking in any of the holes 462 in the rod 460 and one or more holes (not shown) in the bracket 464. In this way the rod 460 may be vertically adjusted.

In the operation of the garden tractor 20 of the present invention, the operator adjusts the depth control rod 460 (FIG. 1) as described in the preceding paragraph to determine the maximum depth to which the tines 338 of the rotary tiller unit 32 will cut into the ground.

The handle bars 38 are adjusted to the desired vertical position by first pulling the rod 168 rearwardly, moving the handle bars 38 to the desired height, and then releasing the rod 168 permitting its forward end to enter the particular notch 164 with which it is aligned to thereby lock the handle bars 38 in the desired vertical position.

If it is desired to swing the handle bars 38 horizontally, the pedal 150 (FIG. 2) is held down thereby removing the latch 144 (FIG. 4) from the particular notch 142 within which it has been seated. The handle bars 38 are then pivoted to the desired position and the pedal 150 is released thereby allowing the spring 152 to force the latch 144 into engagement with its aligned slot. It is to be understood that the vertical and horizontal adjustment of the handle bars 38 can be accomplished while the tractor is either moving or stationary.

Before starting the engine 26, the control rod 120 is removed to its "neutral" position, i.e., to a position where the locking linkage 92 is positioned as shown in FIG. 3 in which position the V-belts 62 are loose and the drive pulley 54 and driven pulley 60 are spaced from each other.

The desired tractor speed is then determined and set by movement of the lever 232 (FIG. 2). If a fast forward speed is desired, the lever 232 is pivoted to the position shown in FIG. 4 thereby engaging the sliding gear 214 with the internal gear teeth 202 of the sprocket and gear assembly 198. If a slower speed is desired, the lever 232 is pivoted in a counterclockwise direction (FIG. 4) thereby engaging the sliding gear 214 with the gear 220. Should it be desired to operate the tiller and not drive the tractor through the wheels 24, the lever 232 is pivoted to a position which places the teeth of the sliding gear 214 between the gear 220 and the sprocket and gear assembly 198. When the sliding gear 214 is in this position and the right wheel 214 (FIG. 5) is arranged to rotate freely on the axle 246 by partially unscrewing the wing nut 309, the rotary tilling unit 32 may be used to propel the tractor along the ground. It may be desirable to operate the tractor in this way under certain conditions such as when cultivating very hard ground.

It is apparent from the foregoing description that the garden tractor of the present invention provides a unique arrangement of drive parts which includes means for pivoting the engine into three different positions which define a forward, a reverse and an idle position. The drive parts also include a transmission arranged to transmit power to the drive wheels to provide two different forward speed ranges for the tractor. Certain of the drive parts can also be placed in a neutral position where power is transmitted to the rotary tiller unit but not to the drive wheels.

While one embodiment of the present invention has been shown and described, it will be understood that various changes and modifications may be made without departing from the spirit of the invention or the scope of the appended claims.

Having thus described the present invention and the manner in which the same is to be used, what is claimed as new and desired to be protected by Letters Patent is:

1. In an apparatus for tilling soil, a tiller housing, a tiller rotatably mounted within said housing, a cover plate pivotally mounted on the rear of said housing for movement between a lowered position wherein said tiller is inaccessible to an operator to a raised position wherein said tiller is accessible, means for driving said tiller, a clutch included in said drive means and movable from a position wherein said drive means is disengaged from said tiller to a position wherein said drive means is connected to said tiller for driving the same, and means for operating said clutch and locking it into either of its two positions including a pedal pivotally mounted on said housing with one end projecting over said cover, said pedal being positioned to be contacted by and moved to and locked in a clutch disengaging position by said cover when said cover is moved to the raised position wherein said tiller is accessible to the operator.

2. In an apparatus for tilling soil having a housing, a driven pulley rotatably mounted on the housing, an engine pivotally supported by said housing and having an output shaft adjacent said driven pulley, a drive pulley on said output shaft in planar alignment with said driven pulley, and a belt trained around said drive and said driven pulley, the improvement which comprises a bracket supported by said housing and having an outwardly projecting boss thereon, a lever mounted for pivotal movement on said bracket for movement in a plane which intersects said boss, a link connecting one end of said lever with said engine, said link including resilient means wherein pivotal movement of said lever in one direction causes said link to engage said boss and causes said resilient means to resiliently urge said engine in one direction wherein said belt is resiliently tightened on said pulleys and wherein the resilient force is directed between said boss and the pivotal axis of said lever to lock said drive pulley in belt tightening position, a rod connected to the other end of said lever, a transverse pin in said rod, a second lever supported for pivotal movement on said housing and having a slot adjacent one end slidably mounted on said transverse pin, and a locking arm pivotally mounted on said housing at a point spaced from the pivot point of said second lever and having a slot adjacent one end thereof mounted on said transverse pin, said second lever being arranged to be pivoted in one direction wherein said first mentioned lever is pivoted to a position which moves said drive pulley into belt tightening position, said second lever arranged to be pivoted in the opposite direction wherein the weight of said engine creates a compressive force acting on said rod and against said locking arm and said second lever along a line directed between the pivotal axis of said locking arm and said second lever to lock said drive pulley in a neutral position.

3. In an appartus for tilling soil, a housing, an engine clutch comprising a driven pulley rotatably mounted on the housing and having outwardly flared flanges, an engine having an output shaft adjacent said driven pulley, means mounting said engine on said housing for pivotal movement about an axis parallel to the axis of said output shaft, a drive pulley on said output shaft in planar alignment with said driven pulley and having beveled annular edges; a belt trained around said drive and said driven pulley, a bracket supported by said housing and having an outwardly projecting boss therein, a lever pivotally mounted on said bracket for movement in a plane which intersects said boss whereby pivotal movement of said lever in one direction causes said lever to engage said boss, a link connecting one end of said lever with said engine mounting means, said link including resilient means arranged to act in one direction to resiliently urge said engine in a direction to tighten said belt on said pulleys and to act in an opposite direction along a line directed between said boss and the pivotal axis of said lever to lock said link in belt tightening position, and means connected to said lever to pivot the same into and out of belt tightening position.

4. In an apparatus for tilling soil having a housing, a driven pulley rotatably mounted on the housing, an engine pivotally supported by said housing and having an output shaft adjacent said driven pulley, a drive pulley on said output shaft in planar alignment with said driven pulley, and a belt trained around said drive and said driven pulleys, the improvement which comprises a lever pivotally mounted on said housing, a link connecting one end of said lever with said engine, a rod connected to the other end of said lever, transverse abutment means projecting from said rod, a second lever supported for pivotal movement on said housing and having a slot adjacent one end slidably receiving said abutment means, and a locking arm pivotally mounted on said housing at a point spaced from the pivot point of said second lever and having a slot adjacent one end thereof also slidably receiving said transverse abutment means, said second lever being arranged to be pivoted in one direction to pivot said first mentioned lever to a position lowering said engine and moving said drive pulley relative to said driven pulley to tighten said belt, said second lever being arranged to be pivoted in the opposite direction wherein the weight of said engine creates a compressive force acting on said rod and against said locking arm and said second lever along a line directed between the pivotal axes of said locking arm and said second lever to lock said drive pulley in a neutral position.

References Cited in the file of this patent

UNITED STATES PATENTS

| | | |
|---|---|---|
| 1,047,801 | Haney | Dec. 17, 1912 |
| 1,732,506 | Detwiler | Oct. 22, 1929 |
| 1,863,349 | Noelting | June 14, 1932 |
| 2,015,587 | Bready | Sept. 24, 1935 |
| 2,535,254 | Attwell | Dec. 26, 1950 |
| 2,595,854 | Howard | May 6, 1952 |
| 2,597,107 | Kelsey | May 20, 1952 |
| 2,691,928 | Kelsey | Oct. 19, 1954 |
| 2,827,842 | Peterson et al. | Mar. 25, 1958 |
| 2,844,238 | Peterson | July 22, 1958 |

FOREIGN PATENTS

| | | |
|---|---|---|
| 873,577 | France | Mar. 30, 1942 |